April 30, 1929.  G. W. GOODRIDGE  1,711,383

ATTACHING MEANS

Filed Oct. 11, 1927

INVENTOR
GILBERT W. GOODRIDGE
by his attorneys
Howson and Howson

Patented Apr. 30, 1929.

1,711,383

UNITED STATES PATENT OFFICE.

GILBERT W. GOODRIDGE, OF FAIRFIELD, CONNECTICUT, ASSIGNOR TO THE BEAD CHAIN MANUFACTURING COMPANY, OF BRIDGEPORT, CONNECTICUT, A CORPORATION OF CONNECTICUT.

ATTACHING MEANS.

Application filed October 11, 1927. Serial No. 225,494.

My invention relates to means for attaching two parts together, and is particularly useful in its application to securing an auxiliary part to a pencil.

An object of the invention is to provide a simple and effective construction whereby one part may be attached to another, especially a part having an expanded end and the wall of a cylindrical tube. A further object of the invention is to provide means whereby a flexible securing element may be attached to a pencil. Still a further object is the provision of such a construction in a form which will give the maximum flexibility to the connection between the securing device and the pencil end. Other objects will become apparent upon consideration of this specification.

While the invention is equally applicable to substantially any form of auxiliary part having an expanded end, it has peculiar advantages when used for connecting a flexible securing device such as a knotted cord or wire or a chain. The invention is here illustrated in its application to the connection of a ball chain with the cylindrical metal rubber holder on the end of an ordinary pencil.

In the accompanying drawings—

Figure 1:
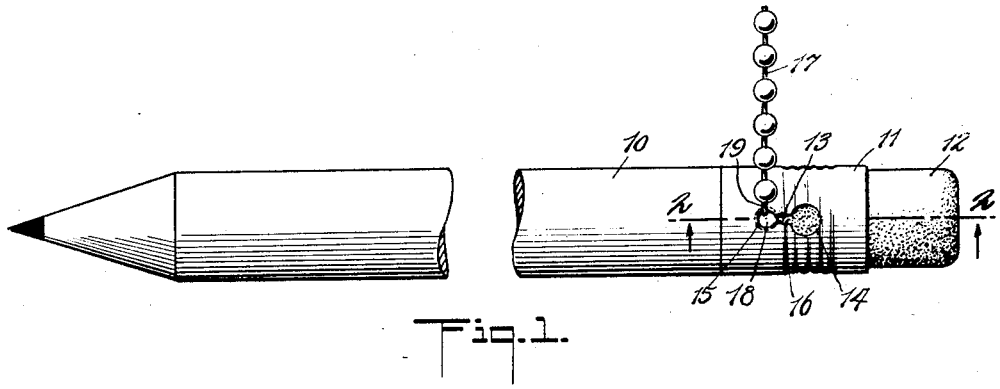
Figure 1 is a broken side elevation of a pencil embodying the invention, with the chain attached and the rubber in operative position.
Figure 2:
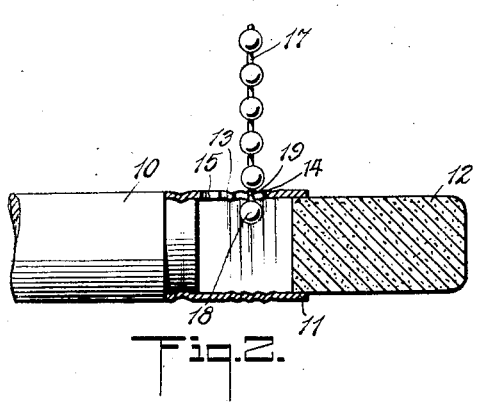
Fig. 2, is a side elevation of the pencil end with the rubber holder and rubber in section, the rubber being out of operative position and the chain end being inserted and ready to be attached.
Figure 3:
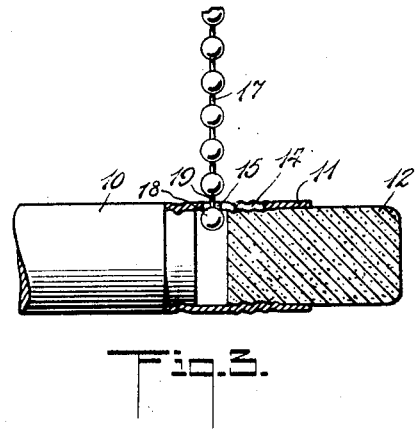
Fig. 3, is a view similar to Fig. 2, the rubber being in operative position, and the chain end fully attached.

In the past flexible securing elements have been attached to pencil ends, but these attachments have been generally of a more or less permanent nature, the removal of the parts being difficult and frequently impossible without damage either to the pencil or to the securing element. In the present invention the objections to these old constructions have been eliminated and a simple method of attachment substituted.

In the form illustrated, a pencil 10 has crimped thereon the usual cylindrical metal shell 11, whereby a rubber eraser 12 is attached to the pencil end. The cylindrical metal shell 11 has a dumb-bell shaped opening 13 therein, one end 14 forming a hole of greater size than the other end 15. A slot 16 connects the two ends. The hole 14 is made large enough to permit the passage of a ball chain therethrough, but the hole 15 is restricted in size and is smaller than the diameter of a ball. The slot 16 is made large enough to permit passage of the chain part which connects the balls. A ball chain 17 is attached to the pencil by having its end ball 18 passed through the larger end 14 of the opening 13 to the inside of the cylindrical shell 11, then moved to a position within the cylindrical shell behind the small end 15 of the opening. The neck 19 connecting the end ball 18 with the next ball in the chain slides easily through the slot 16.

When the end ball 18 of the ball chain 17 has been placed in the position just described, the rubber eraser 12 is forced into the open end of the metallic shell 11 until its inner end passes the hole 14. Thus the chain end is restricted in its position longitudinally of the pencil and is securely attached to the pencil end, the end ball being confined within the metal sheet 11.

To disconnect the chain from the pencil it is merely necessary to remove the rubber eraser 12 from its closing position over the hole 14 and to slide the end ball from its position behind the opening 15 to a position behind the hole 14 from which it may be removed by a direct pull.

Figure 4:
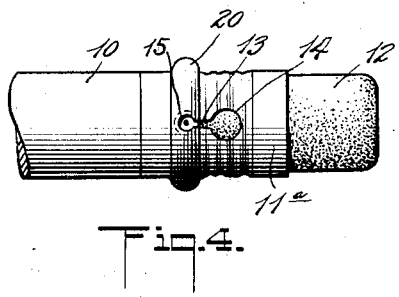
Fig. 4 is a partial side elevation of a pencil looking downward from the line 4—4 of Fig. 5, illustrating a modification of the form shown in Figure 1.
Figure 5:
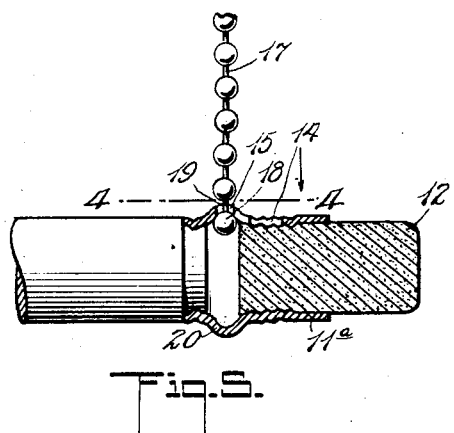
Fig. 5 is a side elevation of this modified form with the rubber holder and rubber in section showing the chain end fully connected.

I may prefer to construct the cylindrical metallic part with an annular bead 20 as shown in Figs. 4 and 5, and to form the smaller hole 15 in the metal forming this bead. With this latter construction the ball chain is enabled to be more closely along the length of the pencil, because the end ball may assume a position partly above the normal surface of the pencil.

Obviously the invention may be applied variously and is not necessarily confined to pencils and erasers. It is evident that the end of an element may be attached to many kinds of tube and that a variety of plugs may be employed to plug the tube. It will be equally apparent that a variety of flexible securing devices may be connected with a pencil end as just described and that the invention is not necesarily limited to use with a ball chain.

With the understanding, therefore, that the invention is susceptible of embodyment in various modified forms, and is applicable to connections of various characters without departing from the underlying thought of the invention,

I claim:

1. A fastener for an expanded end comprising an element having an irregular hole therein part of which is of sufficient size to permit passage of the expanded end therethrough, in combination with means for closing this part.

2. A fastener of an expanded end comprising a part having a large and a small hole therein connected by a slot, in combination with means for closing the large hole, said large hole being of sufficient size to permit passage of the expanded end therethrough, but said small hole being of insufficient size to permit passage of the expanded end therethrough.

3. Means for fastening a chain to a pencil comprising a cylindrical shell crimped to the pencil end having a dumb-bell shaped opening therein disposed longitudinally of the shell, one bell being of sufficient size and the other of insufficient size to permit the passage of the chain's end link therethrough, and means for entering the cylindrical shell and closing the larger bell.

4. Means for fastening a ball chain to a pencil comprising a cylindrical shell crimped to the pencil end having a dumb-bell shaped opening therein disposed longitudinally of the shell, the bell farthest from the crimped end being of sufficient size and the bell nearest the crimped end being of insufficient size to permit the passage of the chain's end ball therethrough, and an eraser adapted to enter the cylindrical shell and close the larger bell thus restraining the chain end in fastened position, substantially as described.

5. Means for fastening a ball chain to a pencil comprising a cylindrical shell crimped to the pencil end having a dumb-bell shaped therein disposed longitudinally of the shell, the bell farthest from the crimped end being of sufficient size and the bell nearest the crimped end being of insufficient size to permit the passage of the chain's end ball therethrough, and an annular bead formed around said shell in which the smaller hole is situated, in combination with an eraser adapted to enter the cylindrical shell and close the larger bell thus restraining the chain end in fastened position, substantially as described.

In testimony whereof I have signed my name to this specification.

GILBERT W. GOODRIDGE.

CERTIFICATE OF CORRECTION.

Patent No. 1,711,383. Granted April 30, 1929, to

GILBERT W. GOODRIDGE.

It is hereby certified that error appears in the printed specification of the above numbered patent requiring correction as follows: Page 2, line 56, claim 5, after the word "shaped" insert the word "opening"; and that the said Letters Patent should be read with this correction therein that the same may conform to the record of the case in the Patent Office.

Signed and sealed this 4th day of June, A. D. 1929.

(Seal)

M. J. Moore,
Acting Commissioner of Patents.